Patented Feb. 13, 1923.

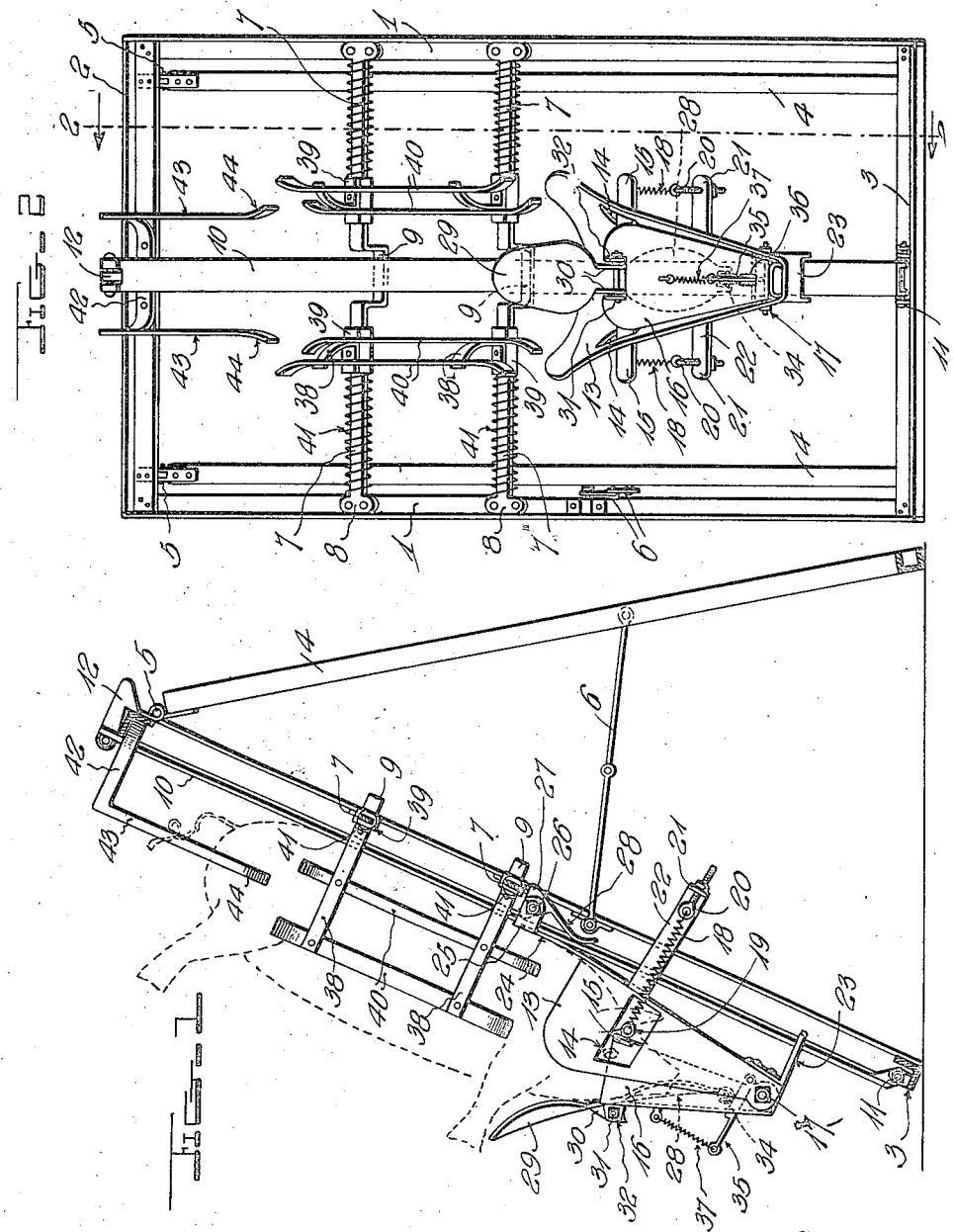

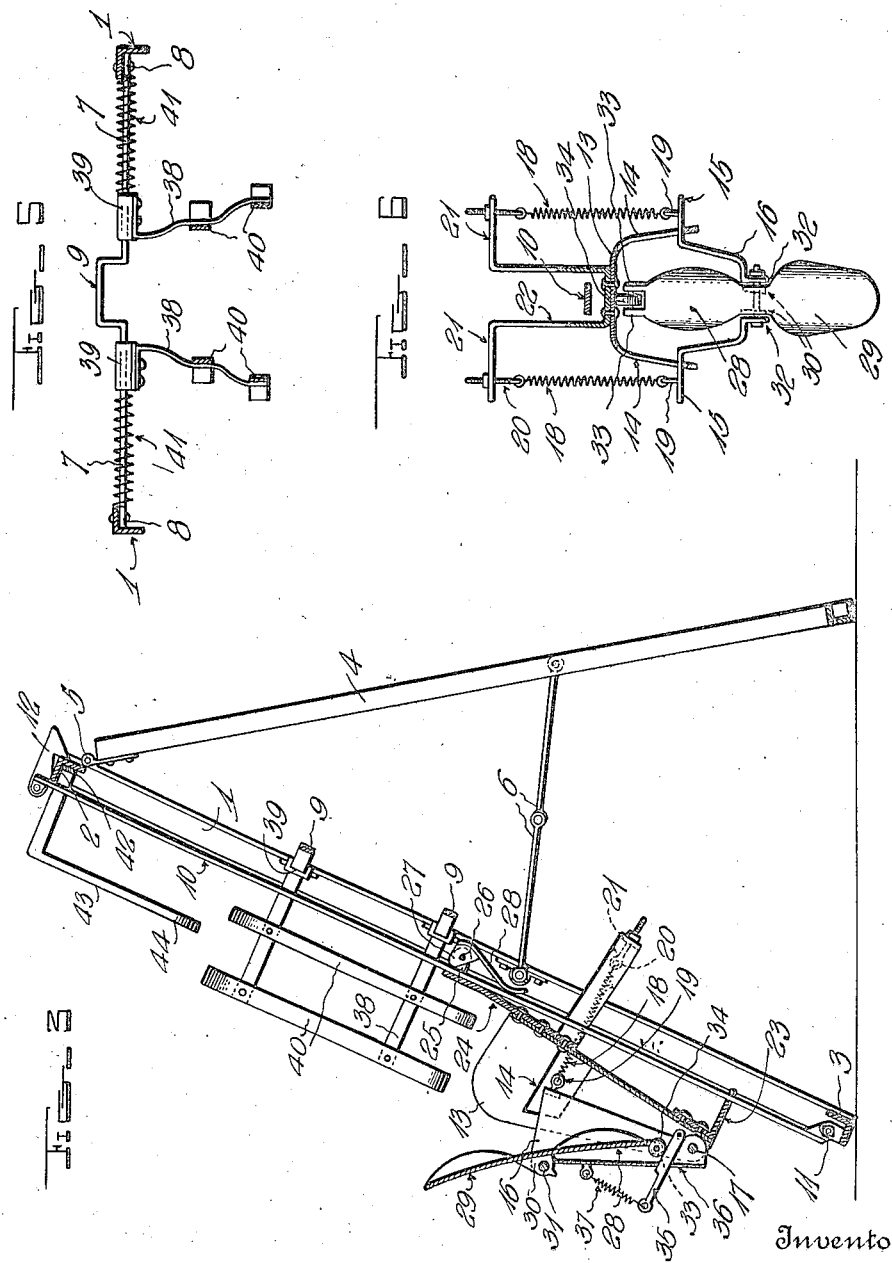

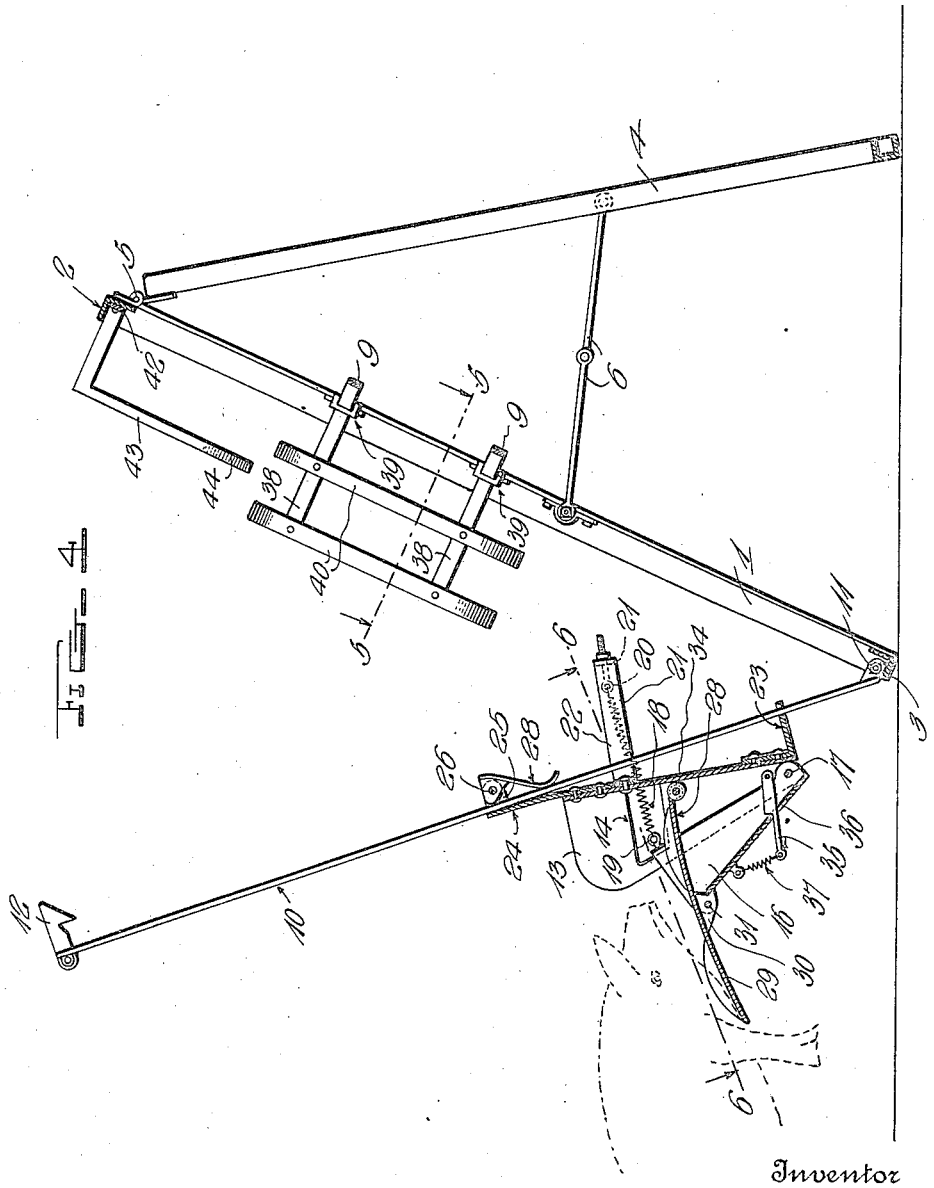

1,445,487

UNITED STATES PATENT OFFICE.

CURTIS A. CLARK, OF COLLEGE CORNER, OHIO.

OPERATING TABLE.

Application filed February 20, 1922. Serial No. 537,951.

*To all whom it may concern:*

Be it known that I, CURTIS A. CLARK, a citizen of the United States, residing at College Corner, in the county of Preble and State of Ohio, have invented certain new and useful Improvements in Operating Tables; and I do declare the following to be a full, clear, and exact description of the invention, such as will enable others skilled in the art to which it appertains to make and use the same.

This invention relates to an improved operating table for use when operating upon pigs, dogs and other animals where it is desired to have the animal held upon its back so that the animal will be held in a convenient position to permit necessary operations to be performed. In vaccinating hogs or in performing operations such as removing tumors, it has been found convenient to have the animal placed upon its back and held in this position so that the animal cannot move while the operation is being performed. This improved operating table includes a supporting frame which will be supported in a substantially vertical position, clamping means carried by the frame for gripping the sides of the animal, and a swinging bar which is hingedly mounted at its lower end for vertical swinging movement into and out of position between the side clamps, and head-holding means carried by the lower end portion of this bar for receiving and holding the head of the animal. This head-holding means is so constructed that when the bar is swung downwardly, the head of an animal standing upon the ground may be thrust into the head-holder or hood and when thrust into the hood will engage a prop which serves to hold the movable gripping wall in an inoperative position. When the head engages this prop, it moves it to remove and permit the wall to be moved to engage the throat and under portion of the head and thus firmly hold the head in the hood. It is further desired to have the prop provided with a handle or lever extension which will extend for engagement with the chest portion of the animal. Therefore, after the animal has been operated upon and the bar swung downwardly so that the animal may be returned to the ground in a standing position, the chest portion of the animal may engage the lever or handle extension when the animal is swung downwardly to the standing position and thus cause the prop to be moved to swing the movable wall to an inoperative position or in other words to a position which will release the head of the animal and permit of the animal readily withdrawing its head from the hood.

Another object of the invention is to so construct the head-holding device that the movable jaw may be limited in its swinging movement by side arms which extend through slots formed in the side portions of the hood for engagement by springs which serve to normally hold this movable wall in a head-gripping position.

Another object of the invention is to provide means upon the upper end portion of the frame for engaging the rump portion of an animal held upon its back between the side clamps and prevent the animal from having movement transversely of the frame.

Another object of the invention is to provide a table so constructed that the head-holding device may be moved longitudinally upon the bar carrying the same and thus the device permitted to be adjusted to accommodate itself to the size of animal to be operated upon.

Another object of the invention is to provide an operating table having side clamps which are slidably mounted in an improved manner upon bars which serve not only as means for slidably mounting the side clamps but also serving as supports for the swinging bar which carries the head-holder.

Another object of the invention is to provide a table of the character described which may have the frame supported in a manner similar to an easel.

Another object of the invention is to provide a table of the character described which will be light in weight and easy to handle and so constructed that it will be strong and durable and not liable to easily get out of order.

This invention is illustrated in the accompanying drawings, wherein:

Figure 1 is a view showing the improved table in section along the line 2—2 of Fig. 2 and in position for use.

Figure 2 is a view showing the improved table in front elevation.

Figure 3 is a longitudinal sectional view through the improved table in position for use.

Figure 4 is a view similar to Fig. 3 with the bar which carries the head-holder swung away from the frame and the movable wall of the hood swung to an inoperative position and held in this inoperative position by the improved prop.

Figure 5 is a sectional view taken along the line 5—5 of Fig. 4.

Figure 6 is a sectional view taken along the line 6—6 of Fig. 4.

This improved operating table is provided with a frame having side bars 1, an upper bar 2 and a lower cross bar 3. The side bars and upper and lower cross bars are formed of angle iron in the form shown but it is of course understood that they may be formed of strips of wood if so desired. Supporting legs 4 are hingedly connected with the upper cross strip or bar 2 as shown at 5 and braces 6 are provided between the supporting legs and side bars 1 to prevent the supporting legs from swinging rearwardly from the frame beyond a desired amount. These braces are similar to those used in connection with step-ladders, easels and other similar devices. Carrier bars 7 extend transversely of the frame in spaced relation as shown in Fig. 2 and have their end portions provided with enlarged heads 8 through which fasteners will pass to securely anchor the carrier bars 7 to the side bars 1 of the frame. These carrier bars are bent as shown at 9 thus providing depressed seats to receive a swinging bar 10 which has its lower end portion hingedly connected with the lower cross bar 3 as shown at 11. It will thus be seen that this swinging bar 10 may have swinging movement in a vertical direction. In order to releasably secure the swinging bar in the position shown in Figs. 1, 2 and 3, the swinging bar has been provided with a latch 12 which is pivotally connected with its upper end as shown in Fig. 1 and is intended to engage the upper cross bar 2. It will thus be seen that this swinging bar may be secured in the position shown in Figs. 1, 2 and 3 but may be released so that it may be swung downwardly toward the ground as shown in Fig. 4.

The pig or other animal which is to be operated upon is to have its head held while being placed upon the table and while being operated upon. There has therefore been provided a hood 13 which is tapered and substantially triangular in shape as shown in Figs. 1 and 2. This hood is provided with flaring side walls which are provided with elongated slots 14 through which extend tongues 15 which extend transversely from a movable wall or gripping element 16 positioned in the hood and having its lower end portion pivotally connected with the lower end portion of the hood by means of bolts or other similar fasteners 17 which serve not only as means to connect the wall with the hood but also serve as means to pivotally mount the wall or clamping element. This clamping element is channel-shaped so that it will be provided with side walls or flanges to extend upon opposite sides of but not necessarily in contact with the side portions of the animal's face. Springs 18 are connected with the tongues 15 and these springs are connected with eyes 20 carried by outwardly extending side arms 21 of a U-shaped yoke 22 which is secured transversely upon the hood and extends upon opposite sides of the swinging bar 10. This hood is to be carried by the swinging arm and to be adjustable longitudinally upon the arm. In order to slidably connect the lower end portion of the hood with the swinging arm, there has been provided a bracket 23 having a slot formed therein to receive the swinging arm. A tongue 24 is secured to the upper end portion of this hood and extends longitudinally from the same. Side arms 25 extend from the tongue 24 upon opposite sides of the swinging bar 10 and carry a pin 26 upon which will be mounted a cam latch 27. From an inspection of Fig. 3, it will be readily seen that when the latch 27 is swung to the operative position shown in this figure, it will grip the bar 10 and serve to securely but releasably lock the hood in the desired position. When it is desired to move the hood along the bar so that the hood will be in the proper position, it is simply necessary to swing the latch upon its pivot 26 through the medium of the actuating handle 28 thus moving it out of gripping contact with the bar 10 and permitting the hood to be moved.

In order to hold the movable wall or gripping element 16 in an inoperative position, there has been provided a prop 28 which extends into the space between the movable wall and hood. This prop is in the form of a device having inner and outer end portions, the inner end portion of which constitutes the prop and the outer end portion 29 of which constitutes a handle. This handle 29 is to engage the chest portion of the animal when the animal is swung off of the table as will be hereinafter brought out. Between the inner and outer end portions of the prop, there have been provided hinged ears 30 so that the prop may be pivotally mounted by means of a pivot pin 31 carried by hinged ears 32 of the walls 16. This prop is provided at its inner end with bearings 33 so that a roller 34 may be rotatably mounted at the inner end of the prop to engage the inner face of the hood and thus permit the prop to be easily swung into and out of an operative position. A latch 35 is pivotally mounted in the hood and extends outwardly through a slot 36 formed in the clamping wall and has its outer end engaged by a spring 37 so that it will be yieldably held in position to engage the clamping wall and retain it in an open position as shown in Figure 4.

When the animal has had its head engaged by the head-holding means and has been swung upwardly to rest with its back against the swinging bar 10 and the swinging bar is secured in the position shown in Figures 1, 2 and 3, the sides of the animal are to be gripped thus permitting the animal to be firmly held. The side clamps are of a duplicate construction and each is provided with standards 38 which are provided at their lower ends with bearings 39 slidably mounted upon the carrier bars 7. Longitudinally extending strips 40 are secured to these standards and have their end portions extending beyond the standards and curved as shown in Fig. 2 so that there will be no danger of the ends of these bars cutting into the sides of the animal when the side clamps are in gripping engagement with the sides of the animal. Springs 41 are provided upon the carrier bars 7 and engage the bearings 39 to yieldably retain the side clamps in a gripping position. It will thus be seen that when the animal and swinging bar 10 are swung upwardly from the ground to the position shown in Figs. 1 and 3, the animal's body may pass between the side clamps and the springs will hold the side clamps in firm engagement with the sides of the animal. In some cases, it is also desired to have the rump portion of the animal engaged so that this portion of the animal which extends beyond the side clamps may be held against transverse movement. Therefore, there may be provided a holding device which is substantially U-shaped and provided with a cross head 42 secured upon the upper cross bar 2 and extending upon opposite sides of the swinging bar 10. This U-shaped holder has its arms 43 extending upon opposite sides of the bar 10 so that its end portions which are flared as shown at 44 may engage the rump portion of the animal and thus hold this portion of the animal against transverse movement. It will thus be seen that with this device, the animal will be securely held and cannot move while the operation is being performed.

When this device is in use, the hog which is to be operated upon is led up to a position in front of the table. The swinging bar 10 is left in the position shown in Figures 1 and 3 but the prop is swung to the position shown in Fig. 4 so that the movable wall or head-clamping element will be held in the inoperative position by the latch 35. One man holds the animal by the front legs and another holds the rear legs. The head of the animal is then thrust into the hood and as the head enters the hood, it engages the prop and swings it inwardly to engage the latch and move it to a releasing position, thus releasing the wall 16 and permitting the springs 18 to draw the clamping wall to the operative position. With its head held in the hood, the front legs can be released and the operator who holds the rear legs of the animal will force the body of the animal between the side clamps so that the body will be firmly held and the rump portion will be engaged by the holder at the upper end of the frame. It will thus be seen that the animal will be held in the position shown in Figs. 1 and 3 so that it can be readily operated upon. If it is found that the head-holder has not been set at the proper point with respect to the side clamps to accommodate these parts to the size of the animal, the headholder can be adjusted longitudinally upon the bar 10 to the proper position and then again secured. After the necessary operation has been performed, the latch 12 is released and the hind legs of the animal will be released and the animal and bar 10 swung downwardly. As the bar swings downwardly, the animal will move out of engagement with the side clamps and when the bar has swung downwardly a sufficient extent, the animal may be swung down so that its feet will rest upon the ground. As the body of the animal swings away from the bar to bring its feet upon the ground, the chest of the animal will engage the handle or lever extension and the prop will be swung to eject the head of the animal from the hood and at the same time swing the movable wall or head-clamp 16 to the inoperative position. The bar will be swung back into the raised position and the device will then be in position to permit of another animal thrusting its head into the hood. It should be noted that when the animal is in place upon the table, the weight of the animal will retain the head in the hood, so that it cannot possibly work its head out of the hood. There has thus been provided an operating table which will be very efficient in use and which can be very easily made use of.

I claim:

1. An animal holder comprising a frame, a bar extending longitudinally of the frame and hingedly mounted at its lower end for vertical swinging movement, head holding means carried by the bar for receiving the head of the animal with the bar extending along the back of the animal, and clamping means carried by the frame upon opposite sides of the bar for gripping the sides of an animal when the bar is in an upright position with the animal in an inverted position with its head held by the head-holding means and its back against the bar.

2. The structure of claim 1 and means carried by the frame above the side clamping means for engaging the rump portion of the animal and holding the same against side movement.

3. An animal holder comprising a frame, a bar extending longitudinally of the frame and hingedly mounted at its lower end for vertical swinging movement, clamping means carried by the frame upon opposite sides of said bar, and head-holding means carried by the bar below the side clamps and adjustable longitudinally upon the bar.

4. An animal holder comprising a frame including body holding means and head-holding means comprising a hood portion for engaging the top and side portions of the head of an animal and a wall for extending beneath the throat portion of an animal movably connected with said hood and yieldably held in position to clamp the throat portion of the head of an animal thrust into the hood.

5. An animal holder comprising a frame including a longitudinally extending bar and head-holding means comprising a hood portion carried by said bar and having a top and side walls, a lower wall pivotally connected with the hood at one end, and resilient means yieldably holding the movable wall in a clamping position for engaging the throat portion of the head of an animal and retaining the head in the hood.

6. The structure of claim 5 having the lower wall provided with side arms adjacent its free end and a yoke extending from the hood, the resilient means for holding the movable wall in a clamping position being connected with the yoke and side arms.

7. An animal holder comprising a frame including a longitudinally extending bar and head-holding means comprising a hood portion carried by said bar, a lower wall pivotally connected with the hood at one end, resilient means yieldably holding the movable wall in a clamping position for engaging the head of an animal and retaining the head in the hood, and a prop for holding the movable wall in an inoperative position moved to release the movable wall by the head of the animal when thrust into the hood.

8. The structure of claim 7 having the prop pivotally connected with the free end portion of said movable wall and extending between the wall and hood for engaging the hood and forcing the wall away from the hood when the prop is swung to an operative position.

9. The structure of claim 7 having the prop pivotally connected with the free end portion of said movable wall and extending between the wall and hood for engaging the hood and forcing the wall away from the hood when the prop is swung to an operative position, the prop having a handle extension extending from its pivoted end for engagement by an animal when removed from the holder whereby an animal when removed may set the head-holder in an open position for the next animal.

10. An animal holder comprising a frame, means carried by the frame for gripping the sides of an animal, a swinging bar extending between said gripping means and having vertical swinging movement from its lower end, a hood carried by said bar below said gripping means for receiving the head of an animal and extending along the back of the neck, a gripping wall pivotally connected with said hood engaging the throat portion of an animal's head yieldably held in an operative position, a prop for holding said wall in an inoperative position pivotally connected with the wall and extending between the wall and hood and moved to permit movement of the wall to a gripping position by an animal's head when thrust into the hood, a handle element extending from the pivoted end of said prop and moved to swing the prop to an operative position by engagement with the chest of an animal removed from the animal holder, and resilient means connected with said handle to yieldably hold the prop in an operative position.

11. An animal holder comprising a frame, means for supporting the frame in an upright position, cross bars carried by said frame and offset intermediate the width thereof to provide seats, a bar pivotally connected with the lower end of said frame for vertical swinging movement and extending longitudinally of the frame and resting in said seats and having its upper end releasably secured, clamping elements for engaging the sides of an animal slidably mounted upon said cross bars upon opposite sides of said seats, springs upon said cross bars engaging said clamps and yieldably holding the same in an operative position, means carried by said frame above said clamps for engaging the rump portion of an animal and holding the same against transverse movement, and head-holding means mounted upon the bar below said clamps and adjustable longitudinally upon the bar.

In testimony whereof I have hereunto set my hand.

CURTIS A. CLARK.